Figure 2:
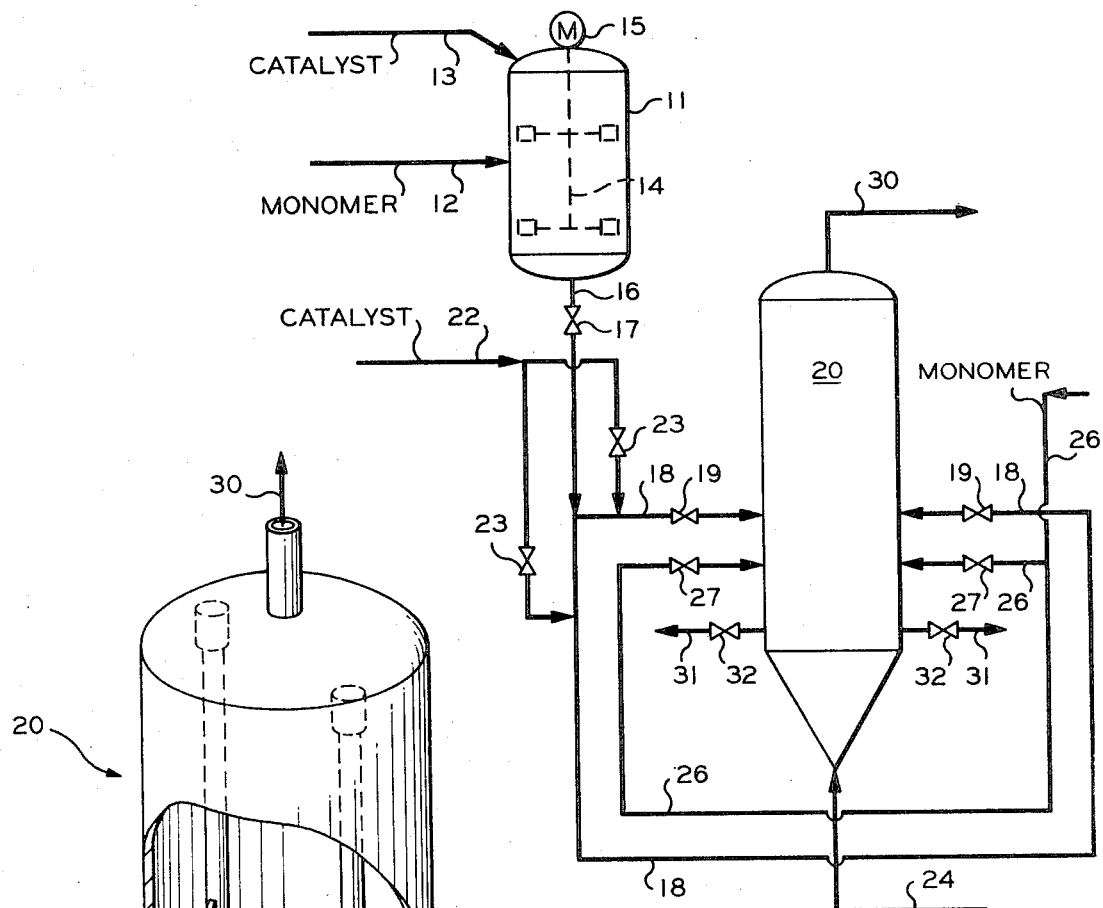

United States Patent [19]
Warzell

[11] 3,723,395
[45] Mar. 27, 1973

[54] BATCH-CONTINUOUS REACTION PROCESS IN A FLUIDIZED BED

[75] Inventor: Fred M. Warzell, Taylors, S.C.

[73] Assignee: Phillips Petroleum Company, Bartlesville, Okla.

[22] Filed: May 10, 1971

[21] Appl. No.: 141,998

Related U.S. Application Data

[62] Division of Ser. No. 826,399, May 21, 1969, Pat. No. 3,615,253.

[52] U.S. Cl..........260/78.5 CL, 23/288 D, 23/288 S, 34/10, 260/82.1, 260/85.5 XA, 260/86.3, 260/87.1, 260/87.5 C, 260/87.7, 260/92.8 R, 260/94.9 P, 263/53 A
[51] Int. Cl..........C08f 3/30, C08f 15/02, F26b 3/08
[58] Field of Search.....23/288 S, 288 D; 260/92.8 R, 260/87.5 C, 87.5 R, 94.9 P, 82.1, 78.5; 263/53 A; 34/10

[56] References Cited

UNITED STATES PATENTS 3,578,646   5/1971   Moberly et al..................260/87.5 C
3,615,253   10/1971   Warzel..............................23/288 S

FOREIGN PATENTS OR APPLICATIONS 1,054,028   1/1967   Great Britain ..................260/94.9 P

*Primary Examiner*—James A. Seidleck
*Assistant Examiner*—A. Holler
*Attorney*—Young & Quigg

[57] ABSTRACT

Material increases in throughput and output of batch-type reactors are obtained by avoiding operational time-losses in dumping and filling and start-up. The improvements are achieved by a flexible divider which extends upwards from the bottom of the unit and which moves from one side of the reactor to the other to increase and decrease, respectively, the volumes of the sections of the reactor. One section can be functional while the other section is being emptied and refilled. The combined output of the sections approaches the output of a continuous reactor.

9 Claims, 2 Drawing Figures

INVENTOR.
F. M. WARZEL

BY Young *&* Quigg

ATTORNEYS

BATCH-CONTINUOUS REACTION PROCESS IN A FLUIDIZED BED

This is a division of application Ser. No. 826,399, filed May 21, 1969, now U.S. Pat. No. 3,615,253.

My invention relates to an apparatus for chemical reactions and drying operations. In another aspect, my invention relates to a batch apparatus or reactor which operates in a substantially continuous manner. It further relates to an improved process for the polymerization of vinyl chloride. In still another aspect, it relates to improved methods for drying or calcining of various solids.

Many processes and unit operations utilize batch-type operations, i.e., various types of polymerization reactions, drying processes, calcining operations. A batch operation can be on a definite time cycle. The batch reactor can be fully dumped without leaving residual material in the unit, which helps avoid build-ups and accumulations of undesirable residues. There is no mixing of fresh reactants with already reacted materials. In a continuous reactor the very continuous nature of the process may itself be undesirable since some materials will have extremely short residence times, and other portions of the reactants may have exceedingly long or even theoretically infinite residence times.

However, the batch process is subject to inherent loss of time characteristics. And, time is money. The very periodicity of a batch process means a waste or loss of time, time in filling, time in start-up, time in dumping, all relatively nonproducing times which cumulatively represent a considerable loss to the processor.

The processor frequently tries to compensate for the inherent time-loss features of a batch process by installing a number of batch reactors, two, three, or more. Of course, such multiple installations represent substantial increases in cost, investment outlays, space utilization in the plant itself, manpower requirements, control features.

Uniquely, by my invention, one batch reactor is able to do the job of a battery of several batch reactors. One of my reactors is capable of producing material in a batch process with batch process advantages, yet with productivity approaching continuous operation. Therefore, I call the units of my invention continuous batch reactors or continuous batch dryers.

I achieve the equivalent of a continuous process in a batch operation by partitioning the reactor with a flexible sheet or flexible divider. This flexible sheet or divider can be flexed across its horizontal dimension and swept back and forth across the dimension of the reactor. This flexible divider effectively divides the reactor into two portions, and the movement of the divider, the flexing, is such that one section periodically or continuously increases in volume capacity during the time that materials are added and during the time that reactions are conducted, while the other section decreases in capacity as materials are discharged therefrom.

My apparatus particularly lends itself to fluidized operations of polymerization, drying, and the like, and for such operations the divider will extend well above the expanded level of the fluidized bed, well into the vapor space above the expanded fluidized bed.

Accordingly, it is an object of my invention to increase the output capacities of batch reactors and dryers. It is a further object of my invention to reduce the unproductive times of batch reactors and dryers. Another object of my invention is to provide improved fluidized bed polymerization of monomers to polymers. A still additional object of my invention is to provide an improved method for the polymerization of vinyl chloride. It is also an object of my invention to provide a method of improved drying and of calcining operations.

Other aspects, objects, and the several advantages of my invention will be apparent to one skilled in the art from the following description and appended claims.

It is often desirable to operate batch-wise. It is also desirable to avoid the time loss characteristics of batch-wise operation. This is exactly what I have accomplished.

My continuous batch reactors and continuous batch dryers are positioned with a vertical flexible sheet or flexible divider, which sheet will be of substantially S-shape when of maximum width and at mid-position. The flexible divider can be made of any desired material such as iron, steel, aluminum, titanium, various plastic materials, or any other material of construction which is flexible, chemically inert to the particular reactants, and suitably temperature resistant to the particular process or drying operations.

In presently contemplated embodiments, the sheet has a width essentially equal to about one-half the circumference of the reactor or dryer, which results in the characteristic S-shape at mid-position. Of course, it will be readily apparent in studying my description and embodiments that the width of the sheet along the S may be similar to or greater or lesser than one-half the circumference of the reactor. For example, when one or both of the edges of the sheet along the vertical height of the reactor are permitted to move laterally along the circumference of the reactor with changes in section volume, then the minimum width of the divider will be at least the inside diameter of the reactor.

It is anticipated that both beds will be fluidized essentially continuously. One portion or section of my reactor will increase in volume by the admission of feed materials. The other section or portion will decrease in volume as finished material is withdrawn. While in many applications of my continuous batch unit the application of external force to the divider in order to aid or assist its movement may be necessary or helpful, it should be understood that in some applications the divider itself will move of its own accord, so to speak, as material is added to or withdrawn from each section and the opposing forces or pressures of the sections will tend to equalize each other thus resulting in movement of the divider in one direction or another.

The description of my invention is detailed particularly in regard to a polymerization reaction. Additional examples are given in regard to drying and calcining operations. However, it should be understood and recognized that particular embodiments of my invention as described herein should not be taken as being unduly limiting of my invention, since it is readily apparent that my invention undoubtedly will have many other applications to other processes.

EXAMPLE OF POLYMERIZATION

In some reactions, good control of residence time of materials in a reactor is of considerable concern. For example, the molecular weight distribution of the polymer is often much narrower in the product of a batch process than is possible or obtainable in the product of a continuous polymerization process. In a continuous polymerization process, the molecular weight distribution of the polymer is much broader due to the averaging effects on the residence time of monomer and of catalyst which result in a product of variable particle size and of a considerable spread in molecular weight, i.e., a rather wide molecular weight distribution. Nevertheless, continuous polymerization processes usually have heretofore been practiced simply because of the commercial necessities of producing amounts of materials at minimum cost.

Now, by my invention, the best polyvinyl chloride with narrow molecular weight distribution can be produced essentially on a productivity level of a continuous process, yet by essentially a batch method necessary to the preferred product. Further, the batch approach to polyvinyl chloride produces polymer which ultimately gives a film desirably free of the faults known as "fish-eyes."

Figure 1:
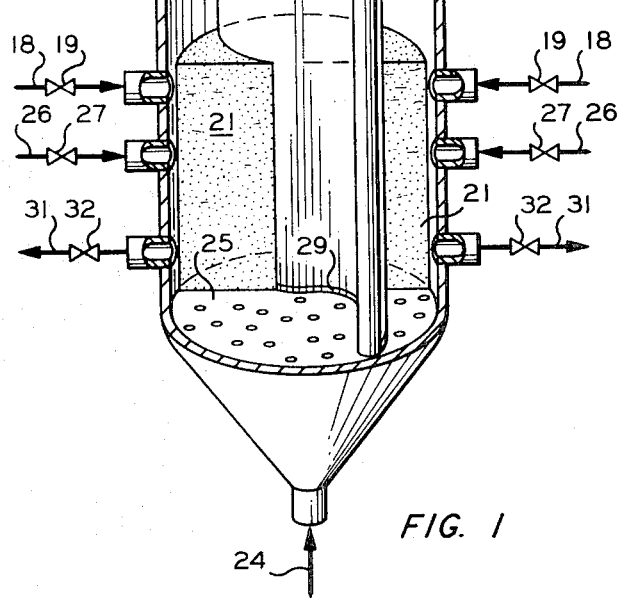

Briefly, my drawing attached shows a reactor of my invention suitable for polymerization of vinyl chloride. The drawing in FIG. 2 shows a small stirred reactor to which catalyst and monomer are fed to provide or produce the seed particles needed for the main reactor. The main reactor is one of my continuous batch reactors to which seed particles, additional catalyst, additional monomer, and fluidizing gas are added in the production process. The drawing in FIG. 1 shows the input to my continuous batch reactor of a fluidizing gas, a perforated support plate for the bed, input and output lines for material to and from the bed, relative height of a fluidized bed in operation, and shows the flexible sheet or flexible divider which thus actually forms two separate beds. The flexible sheet is shown essentially in mid-position with an S-shape. Of course, as the divider or sheet flexes to one side or the other, the S-shape changes to a simple curve ultimately approaching closely to the side of the continuous batch reactor in final position. The drawing is described in more detail hereinafter together with particular operating conditions for the polymerization of vinyl chloride.

For the polymerization of vinyl chloride, the continuous batch reactor typically will have an inside diameter of about 4 feet. Allowance must be made in the height of the unit for the continuous increase or expansion of the bed as additional reactants added thereto polymerize during the process time. Here, the expanded final bed height will be about 8 feet in a 4 foot diameter reactor. The flexible divider should have a height of about twice the final bed height, or in this embodiment approximately 16 feet overall, thus about 8 feet above the final bed height.

In the continuous batch reactor, there can be a variable and noncritical amount of free space or additional free board above the top of the flexible divider. The free space above the divider allows for collection and removal or exhaust of the fluidizing gas or gases; for appurtenant apparatus such as controllers or guiders for the top or top corners of the divider to permit or guide or even mechanically assist or control the movement and positioning of the divider either continuously or from time to time; for various sensing and/or control devices which might be required by the process, such as for temperature, pressure, gas velocity, and the like; for various connections necessary for the process; and the like. Outlets for removal of reactants at the end of the process interval, of course, will be within the area of the bed itself, and removal may be one of or any suitable combination of connections at the side, top, or bottom of the reactor.

Taking the beginning of a cycle when the divider is essentially adjacent to one side of my continuous batch reactor, the section involved being at minimum volume or capacity as reactants commence being added thereto for initial start off, the partition moves across the support plate as reactants are added over an interval of about 10 minutes, following which polymerization is continued for approximately 1 hour and 50 minutes to give a 2 hour half cycle time. Of course, the divider can be caused to move continuously at a more or less uniform rate, depending upon how seed particles are generated, whether such particles can be stored, initiator half life, initiator productivity, and the like. The divider need not be in motion continuously but can move or be moved periodically in response to the requirements of differing processes.

Referring now to the drawing, there is illustrated a schematic illustration of a polymerization system embodying my continuous batch reactor. The liquid phase bulk polymerization production of seed polymer particles is conducted in agitated reactor 11 in FIG. 2. This reactor 11 is illustrated as a stirred pot reactor, but any known type of agitated liquid phase reactor can be utilized, for example, a loop reactor. Into reactor 11 are introduced monomer by conduit 12 and catalyst by conduit 13. Solid polymer particles are produced and are circulated by agitator 14 powered by motor 15. The reaction in reactor 11 can be conducted in the absence of a solvent or diluent, though a small amount of diluent normally is employed usually constituting less than about 5 weight percent of the charge. Such solvent or diluent should be at least partly miscible with the monomer, but should not be a solvent for the polymer formed. The temperature and pressure in reactor 11 are selected such as to maintain the monomer in the liquid phase and generally will be in the range of about 100° F. to about 150° F., with a pressure range of about 75 psia to about 150 psia.

Reactor 11 is provided with a polymer product take off conduit 16 containing a valve 17. Valve 17 can be manipulated continuously or periodically to withdraw a portion of the reaction mixture from reactor 11 to maintain the concentration of solid polymer particles in reactor 11 usually less than about 15 weight percent, thus maintaining a flowable slurry. The reaction effluent from reactor 11 is passed through conduit 18 into either of sections 21 of my continuous batch reactor 20. Conduit 18 is provided with valves 19 to regulate the flow of reaction mixture to sections 21 of the continuous batch reactor 20. Additional catalyst can be added by means of conduit 22 controlled by valves 23 and shown here as being added with the seed polymer particles in conduit 18, though separate direct addition to the continuous batch reactor 20 can be practiced if desired.

Gaseous monomer is passed through conduit 24 in the lower portion of the continuous batch reactor 20 below the support plate 25. Additional liquid monomer if desired can be added through conduits 26 controlled by valves 27 to the continuous batch reactor 20. The pressure and temperature within the continuous batch reactor 20 will be such that the liquid monomer vaporizes immediately, thus absorbing large quantities of heat of reaction. The thus vaporized monomer, together with the gaseous monomer, serve to fluidize the beds of polymer particles.

The flexible divider 28 of my invention is shown in FIG. 1 installed in reactor 20. The divider 28 thus illustrated is an embodiment wherein the width of divider 28 is sufficient to give it a characteristic S-shape at mid-position when viewed looking downwardly upon it.

The divider 28 is installed in reactor 20 in a manner so that the lower or bottom edge of divider 28 will be effectively adjacent to the support plate 25, though relationship must be such that divider 28 will move freely back and forth across plate 25. For this reason, it is preferable that divider 28 be equipped with a flexible sealing means 29, or bristles or flexible fingers, along its lower edge to avoid admixing the contents of sections 21, and yet permit free sweep of divider 28.

In turn, the support plate 25 should be free of obstructions so that the edge of the divider sheet 28 can move freely across the support plate 25 without interference by obstructions. A fluidized bed reactor frequently has distributor caps on the support plate to prevent the flow of solids through it when the fluidization is stopped. Such distributor caps can be omitted in the reactor of my invention, or the equivalent of distributor caps can be mounted under the support plate 25 to accomplish the same result and yet leave the upper surface of the support plate 25 unencumbered with obstructions to the sweep of the divider sheet 28.

The divider 28 can be caused, by external means such as mechanical drive and the like, to move back and forth across the support plate 25, or divider 28 can move in response to change in solids content by weight or volume of one of sections 21 relative to the other; or by a combination thereof; as may be desired for particular processes.

The vertical edges of this embodiment of divider 28 are immediately and sealably adjacent to the opposite interior walls of reactor 20, the vertical edges being positioned approximately 180° from each other around the internal circumference of reactor 20. The vertical edges should be free to rotate as the divider 28 flexes or moves back and forth, and rotate sufficiently in each lateral direction so that divider 28 can approach each inside vertical surface of reactor 20 fairly closely so as to reduce the volume of each section 21 in turn essentially toward zero, or at least to very low volume as the contents of a section 21 are removed as a batch at the end of a polymerization reaction.

When both sections 21 contain about the same content of fluidized bed, the divider 28 will be at or near its mid-position as here illustrated. As either bed increases in fluidized bed volume, either by bed growth or by dumping product from one section 21 or both, then the divider will tend to move toward the bed of lesser content. Or, of course, means can be installed to hold the divider 28 at any position; or to cause it to sweep in response to time, or feed, or other factor.

Where the divider 28 is free to move without external control, as here illustrated, it will tend to exert a balancing effect between said sections 21 in moving inwardly toward the section of lesser content thus exposing a greater area of support plate 25 to the section of greater content and thus admitting additional fluidizing gas to the area of greater content. At the same time, the movement of the divider 28 away from the section 21 of greater content reduces the depth of bed in such section; conversely, movement of divider 28 inwardly toward the section 21 of lesser content reduces the lesser content section volume while maintaining bed depth, and reduces the area of support plate exposed thereto which reduces total flow of fluidizing gas. Thus, such movement automatically maintains a proper relationship between the cross-sectional area of each bed and the flow of fluidizing gas upwardly therethrough.

In a fluidizing operation, the fluidized beds in each section 21 will be substantially equal in height, though the total volumes or capacities of each section 21 at various times in a cycle will differ considerably. Of course, during the final dump-out or clean-out of a particular charge from a given section 21 as the divider 28 reaches one side or the other, and again at start off as a new charge of reactants is being added, the bed height will differ greatly.

It should be realized that the flexible divider 28 need not have an S-shape at all, even at mid-position. My invention encompasses a divider similar to what I have just described, but one which has a width essentially that of the inside diameter of reactor 20. In this embodiment, my flexible divider 28 is disposed so that its vertical edges are immediately adjacent to opposing inside surfaces or walls of reactor 20, and with one or both such edges free to move laterally around at least a part of the inside circumference of reactor 20 toward the section 21 of decreasing capacity. Thus, in addition to a flexing movement, my divider can have a lateral movement of one or both edges, and result in essentially the same effects and benefits as hereinbefore described.

Further, my flexible divider can have a width greater than, even substantially greater than, one-half the inner circumference of the reactor. With the much wider flexible divider, one or both vertical edges would be installed so as to move laterally around at least a part of the inside circumference of reactor 20, and such edge or edges would then move or slide away from the section 21 of decreasing volume.

The rate of flow of fluidizing gas from conduit 24 upwardly through separator plate 25 and sections 21 of my continuous batch reactor 20 will generally be in the range of about 0.1 foot per second to about 0.4 foot per second depending upon desired particle size of the polymer, though a value of about 0.2 foot per second is most usually employed in the dimensional size reactor as hereinbefore described. The pressure and temperature in the continuous batch reactor can range from about 60 psia to about 150 psia, and about 100° F. to about 150° F., respectively.

While the temperature of the gaseous monomer used as the fluidizing gas can be varied to aid in the control of the temperature in the continuous batch reactor, it is usually found most convenient for the fluidizing gaseous monomer to be maintained substantially at the desired reactor temperature, and the temperature control of material in the reactor be effected through variation in the amount of liquid monomer introduced.

Pressure and temperature in the reactor can certainly be controlled by various recorders and controllers not shown on the drawing in order to limit the drawing to primarily essential characteristics of my reactor. It should be understood that various control methods for product or reactant feeding, temperature and pressure recording and controlling, all would be within the compass of my invention.

A gaseous monomer stream, usually containing entrained polymer fines, is exited from the overhead portion of the continuous batch reactor 20 by means of conduit 30 into a separator (not shown) for removal of fines. The solid fines can be utilized, if desired, as all of or as a portion of the seed particles by recycle. Gaseous monomer also can be recycled as fluidizing gas. If desired, a portion of the gaseous monomer can be taken to an indirect heat exchanger (not shown) to be condensed and fed as liquid monomer or as a portion of the liquid monomer.

At the end of the reaction time in either of the fluidized beds 21 when the reacting section volume has grown by a factor of 2, 3 or 4, as may be desired, the batch then is removed or dumped by means of exit conduit 31 controlled by valve 32 and the mixture of polymer particles and including absorbed liquid gaseous monomer and diluent if any are conducted to any standard recovery separator method such as to a fluidized bed flash column where gaseous monomer can be removed or separated from the polymer particles.

For the sake of simplicity, I have described above the polymerization process in the terms of polymerization of vinyl chloride alone. However, the process is also applicable to a copolymerization process of vinyl chloride with at least one other suitable comonomer wherein the vinyl chloride preferably constitutes at least 60 weight percent of total monomers. Examples of suitable comonomers include vinylidene derivatives, specially vinylidene chloride; vinyl esters of carboxylic acids such as vinyl acetate, vinyl propionate, vinyl buterate, vinyl benzoate; esters of unsaturated acids such as methylacrylate, butylacrylate, allylacrylate, as well as corresponding esters of methacrylic acid; vinyl aromatic compounds such as styrene, or the halogenated styrenes such as the chlorostyrenes, dichlorostyrenes, and the substituted styrenes such as paraethylstyrene, divinylbenzene, vinylnaphthalene; dienes such as butadienes, chloroprenes; amides such as acrylic acid amide; nitriles such as acrylic acid nitrile; esters of alpha-beta unsaturated carboxylic acids such as methyl, amyl, octyl, allyl, and phenyl esters of maleic, itaconic, fumaric acid; monoolefins such as ethylene, propylene, and higher monoolefins; and even combinations thereof.

In a copolymerizable process, all of the fresh monomer can be introduced into the seed reactor, or a portion thereto and the remainder into the continuous batch reactor, or all of the comonomer can be introduced into the continuous batch reactor. In fact, it is even possible to eliminate the seed particle polymer reactor since seed particles can be produced by grinding up priorly produced polymer, or by separating fines from a prior batch and sizing by grinding or sieving or otherwise to provide suitable mesh size for the seed which generally will be in the range of about 50 to about 200 US mesh.

While any known catalyst for the polymerization of vinyl chloride can be utilized, the presently preferred catalyst is a free radical precursor. One group of catalysts particularly suitable consists of the hexahalogenethanes wherein the halogen can be fluorine, chlorine, bromine, and iodine. Another effective group consists of the peroxides whose organic radicals can be alkyl, cycloalkyl, aryl, alkaryl, aralkyl, and acyl radicals of from about one to about 15 carbon atoms. The dialkylperoxydicarbonates also are effective although the R groups of the organic alkyl radicals should be limited to from one to about six carbon atoms, and diisopropylperoxydicarbonate is particularly preferred because of its stability.

Specific examples of the several catalyst types include hexachloro-ethane, 1,1-tribromo-2,2-trichloroethane, dimethyl peroxide, dicyclohexylperoxide, diphenyl peroxide, bis(alpha,alpha-diisopropyl-4-ethylbenzyl)peroxide, diazylaminobenzene, and the like. Any known free radical precursor known to the industry can be utilized and many additional such precursors are listed in the book, *Free Radials* by Ingram, Academic Press, Inc., New York City, 1958.

As indicated hereinbefore, a small amount of diluent can be employed in the initial seed polymer particle reactor. Examples of such diluents include alcohols such as propanol; alkanes having from three to about 12 carbon atoms per molecule such as propane, octane; cycloalkanes having from three to about 12 carbon atoms per molecule such as cyclopropane, cyclodecane; aromatics having from six to about 12 carbon atoms per molecule including benzene, the xylenes, and the like; and compatible combinations thereof.

The reactor 11, of course, can be provided with heat exchange means, external or internal; and my continuous batch reactor 20 can be equipped with various types of controls or even with heat exchange equipment if desired. Any such appurtenant equipment would be within the knowledge of one skilled in the art, once he had been instructed in the basics of my continuous batch reactor.

EXAMPLE OF DRYING OF A POLYMER

The continuous batch dryer is applicable to the recovery of solid polymer from hydrocarbon diluents and from hydrocarbon slurries. The polymer can be formed by the method described in detail hereinabove, or can be formed by methods such as that described by J. P. Hogan and R. L. Banks in U.S. Pat. No. 2,825,721 filed Mar. 26, 1956, or by other known methods of preparation using other types of catalysts.

The polymer can be formed as a slurry in any type of reactor including a continuous batch reactor as we have described hereinbefore. The slurry of polymer in a diluent, prepared either as discrete particles during polymerization or by precipitation in the solvent by cooling of a polymer solvent solution, is passed to a fluidized bed dryer. The slurry enters a zone of low pressure causing the solvent or diluent to flash off, leaving the polymer particles which fall to a lower level in the zone forming a bed of polymer. A portion of the flashed solvent or diluent is cycled back to the bed zone and passes through the polymer bed thus fluidizing the bed and at the same time further drying the polymer particles. The flashed-off solvent or diluent vapors can be passed through a heat exchanger where the vapors can be heated before being brought back to the bottom of the fluidized bed to act as both a fluidizing and a drying gas.

For example, ethylene as a polymerizable monomer, pentane as a reaction diluent and solvent, and a microspherical catalyst consisting of 2.5 percent chromium as the oxide on a 90:10 silica:aluminum support are reacted under polymerization conditions at a rate to provide a polymer slurry consisting of 25 weight percent polymer and 0.07 weight percent catalyst. The reactor operates at approximately 210° F. and 500 psia. The polymer formed is in the form of discrete nonagglutinative particles. This slurry then is brought to the fluidized continuous batch dryer wherein the pressure is approximately 110 psia and the temperature about 200° F. Most of the solvent will flash off at this pressure and temperature and the solids become a fluidized bed. The solvent vapors are brought to a separator to remove any traces of entrained polymer fines, and the vapors can then be heated in a heat exchanger to a temperature of about 220° F. and passed to the bottom of the fluidized bed as fluidizing and drying gas.

The polymer dried in this fashion can be removed to a final dryer for removing residual pentane vapors by contact with dry nitrogen at 200° F. sweeping therethrough. This final dryer also can be a continuous batch dryer.

Such methods provide effective means of controlling not only the temperature but the length of time of exposure of the polymer to the drying gases. By the use of the continuous batch dryer the temperature is readily controlled by controlling the temperature of the fluidizing and drying gas. Of course, the drying heat, either alone or as supplementary heat, can be supplied by heat exchange through the walls of the continuous batch reactor. However, in general, most effective drying of a polymer, most uniform heat distribution, can be obtained by supplying the drying heat through the means of the fluidizing gas. This tends to avoid localized hot spots which may soften or otherwise damage the polymer in localized areas. In the continuous batch process the time of exposure of the polymer to the drying gas can be very effectively controlled, none of the polymer will short circuit, and none of the polymer will be in the dryer too long a time. In the continuous batch process, the relationship of length of time of drying versus temperature of drying can be nicely balanced.

Of course, the use of the continuous batch dryer to remove hydrocarbon type solvents and diluents is not restrictive of the invention. Certainly the invention can be applied to the treatment of many thermoplastic materials, polyolefins, polyvinyl chloride, to a large number of copolymers, regardless of the process by which the materials are obtained and regardless of the liquid to be evaporated which may be organic hydrocarbon solvent-diluents, water, alcohols, and a variety of mixtures. Nor is the dryer limited to polymers since it can be usefully employed in the drying of many types of particles even such as sugar and other crystalline particulates.

EXAMPLE OF CALCINING

To illustrate further the versatility of my invention, my continuous batch dryer can be effectively used to dehydrate gypsum, $CaSO_4 \cdot 2H_2O$, to plaster of Paris, $CaSO_4 \cdot \frac{1}{2}H_2O$, which is sometimes written as $2CaSO_4 \cdot H_2O$.

In making plaster of Paris, the calcium sulfate dihydrate, gypsum, is ground to a suitable size for calcining purposes. It is necessary to heat the ground gypsum to about 260° F., or about 127° C., for a sufficient time to remove the equivalent of 1½ molecules of water per molecule of calcium sulfate anhydrous. The use of my continuous batch dryer, or in this case a continuous batch calciner, is highly effective in producing a uniform product uniformly dehydrated by providing uniform heat to the ground gypsum over a uniform time for all material in the charge to the calciner.

Overheating by even a few degrees, i.e., 5° to 10° F., has been found detrimental to the product, resulting in formation of some calcium sulfate anhydrite, even though textbooks state that two molecules of water are lost at 163° to 165° C. (325° F.). Despite the textbooks, experience has shown that overheating of the gypsum by even the few degrees just mentioned is detrimental to the formation of a proper and uniform plaster of Paris. Yet a sufficient time must be provided for the dehydration reaction to occur properly and remove the desired 1½ molecules of water average per molecule of calcium sulfate. Thus my continuous batch calciner is ideal in providing uniform heat distribution and uniform temperature control, to all particles of the charge, without overheating or underheating portions of the charge, and particularly for uniform drying time. The fluidizing and drying gas can be air, or hot combustion gases. Of course, required heat can be introduced through the wall, though this is less effective as the sole source of heat for the drying operation. Plaster of Paris currently is made in large externally fired agitated kettles in a batch operation, so that my continuous batch calciners are a distinct improvement.

My invention has been described in a series of preferred embodiments. Those skilled in the art will see many modifications and further applications which can be made while still obtaining the advantages of my invention. Reasonable variations and modifications are realized to be possible and yet still within the scope of my disclosure without departing from the scope and spirit thereof.

What is claimed is:

1. A process for continuous batch fluidized bed operations which comprises
   a. during a first period of time feeding reactants including at least one particulate material into a first section of a two-section reaction vessel of total defined volume under reaction conditions, said reaction vessel being divided into first and second side-by-side sections by a movable vertical wall, whereby the volume of said first section expands and increases at the expense of the volume of the second section of said two-section reaction vessel, said increase and decrease in volume of each said section being relative to each other and leaving substantially unchanged said total defined volume, increasing the upward flow of the fluidizing fluid through said first section as the volume of said first section increases and decreasing the upward flow of the fluidizing fluid through said second section as the volume of said second section is decreased, b. during a second, subsequent period of time feeding further reactants including said at least one particulate material to said second section of said two-section reaction vessel while removing the products of reaction from said first section, whereby the volume of said first section decreases and the volume of said second section expands and increases at the expense of the volume of said first section, increasing the upward flow of the fluidizing fluid through said second section as the volume of said second section increases and decreasing the upward flow of fluidizing fluid through said first section as the volume of said first section decreases, and c. repeating said steps (a) and (b).

2. A process according to claim 1 wherein said reactants include at least one polymerizable monomer, said at least one particulate material comprises seed polymer particles having a catalyst associated therewith, said reaction conditions are polymerization conditions, and said products of reaction include a polymer.

3. The process of claim 2 wherein said monomer is vinyl chloride and wherein at least one comonomer copolymerizable therewith constitutes from 0 to about 40 weight percent of total monomers, and wherein said fluidizing fluid is a fluidizing gas.

4. A process according to claim 2 wherein said fluidizing fluid is said monomer in the gaseous state.

5. A process according to claim 1 wherein said movable vertical wall is greater than the height of the resulting fluidized beds in said first and second sections but less than the internal height of said reaction vessel, further comprising withdrawing from the upper portion of said reaction vessel above said movable vertical wall a stream of said fluidizing fluid.

6. The process of claim 3 wherein the said polymerization conditions include a temperature of from about 100° F. to about 150° F., a pressure of from about 60 to about 150 psia, and a fluidizing gas flow of from about 0.1 to about 0.4 foot per second.

7. A process according to claim 1 wherein said reactants include particles to be dried, and said reaction conditions are drying conditions.

8. The process of claim 7 wherein said particles are polymer particles, said drying conditions include heating said polymer particles to a temperature above ambient but below the softening point of said polymer particles and maintaining a flow of fluidizing drying vapor a sufficient time to substantially dry said polymer particles, and recovering dried polymer particles as a product.

9. A process according to claim 8 wherein the particulate solids to be dried are hydrated calcium sulfate and the product is plaster of Paris.

* * * * *

UNITED STATES PATENT OFFICE
CERTIFICATE OF CORRECTION

Patent No. 3,723,395                                      Dated: March 27, 1973

Fred M. Warzel

It is certified that error appears in the above-identified patent and that said Letters Patent are hereby corrected as shown below:

On the front page, delete "Warzell" (both instances) and insert -- Warzel --.

Signed and sealed this 18th day of December 1973.

(SEAL)
Attest:

EDWARD M. FLETCHER, JR.
Attesting Officer

RENE D. TEGTMEYER
Acting Commissioner of Patents